United States Patent Office 3,347,827
Patented Oct. 17, 1967

3,347,827
EPOXIDE RESIN COMPOSITION CONTAINING AN AMINE BORANE ACCELERATOR
Henry L. Lee, Jr., San Marino, Calif., assignor to Callery Chemical Company, Pittsburgh, Pa., a corporation of Pennsylvania
No Drawing. Filed Oct. 21, 1964, Ser. No. 405,569
4 Claims. (Cl. 260—47)

ABSTRACT OF THE DISCLOSURE

Heat curable epoxide resin compositions contain a polyglycidyl ether, a polycarboxylic acid anhydride curing agent and a minor amount of an amine borane latent accelerator.

This application is a continuation-in-part of my co-pending applications Ser. No. 848,893, filed Oct. 27, 1959, and Ser. No. 848,903 filed Oct. 27, 1959, both abandoned.

This invention relates to heat curable epoxide resin compositions, and more particularly to such compositions containing an amine borane curing agent or accelerator.

Prior to this invention, it was known that epoxides, i.e., polyglycidyl ethers, and particularly polyglycidyl ethers of polyhydric phenols and alcohols, could be cured by reacting with various amines to form hard insoluble resinous products with a variety of uses. Problems have arisen in the use of amine hardeners, however, that result in operational difficulties or somewhat limited use of the final cured product. For example, many of the amines are so reactive that mixtures with polyglycidyl ethers have a short pot life, i.e., the mixtures harden rapidly at ambient temperature so that the mixtures must be used immediately after they are made. The less reactive amines that have a longer pot life generally require long cure times, even at elevated temperatures, and often have inferior physical properties.

Epoxides have also been cured by reaction with various dicarboxylic acid anhydrides to form hard insoluble resinous products with a variety of uses. Generally, mixtures of the acid anhydrides and epoxides cure or resinify only very slowly at room temperature, so they can easily be shipped and stored for later use. However, they also cure comparatively slowly at elevated temperatures, thereby having a relatively high equipment time requirement for curing. Various amines have previously been incorporated in acid anhydride-epoxide mixtures to decrease the required curing time, but this advantage was gained only at the expense of decreasing the stability of the mixtures against resinification at the lower normal storage and shipment temperatures.

It is an object of this invention to provide heat curable epoxide resin compositions that rapidly cure at elevated temperatures but that are stable against solidification for extended periods of time at ambient storage temperatures. Other objects will be apparent from the following description and claims.

The new heat curable composition of this invention comprises an epoxide constituent, an amine borane constituent and, if desired, a carboxylic acid anhydride constituent, that are formed merely by mixing the constituents together. The amine borane functions as a curing agent in the epoxide-amine borane compositions; such compositions cure readily to form a hard useful resin when heated to an elevated temperature, the lower limit of which varies to some extent with the particular epoxide and amine borane used. However, at lower temperatures, such as ambient atmospheric temperature, the compositions are stable against resinification for an indefinite period of time. The amine borane functions as a latent accelerator in compositions containing both an epoxide and a carboxylic acid anhydride; a minor amount of an amine borane admixed with a carboxylic acid anhydride-epoxide composition accelerates the cure at elevated temperatures, but does not substantially decrease the stability against solidification at ordinary temperatures.

The epoxide constituents of the new resin forming compositions are polyglycidyl ethers of polyhydric alcohols or phenols having a 1,2-epoxy equivalency greater than 1.0. The 1,2-epoxy equivalency refers to the average number of reactive epoxy groups

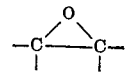

contained in the average molecule of the glycidyl ether. Thus, for example, the epoxy equivalency of diglycidyl ether of ethylene glycol is 2.0, while that of triglycidyl ether of glycerol is 3.0. The usual methods of producing glycidyl ethers of polyhydric alcohols and phenols do not generally produce substantially pure simple compounds, but produce a mixture of compounds having different molecular weights which may contain a minor proportion of compounds wherein the terminal glycidyl radicals are in a hydrated form. Therefore, the epoxy equivalent of such glycidyl ethers is not a simple integer. For example, the glycidyl ether of a dihydric alcohol will have an epoxy equivalency between 1.0 and 2.0. Illustrative of the glycidyl ethers useable in the new compositions are diglycidyl monoethers; diglycidyl polyethers such as diglycidyl ethers of ethylene glycol, trimethylene glycol, glycerol, and the like, and compounds containing more than two glycidyl groups such as polyglycidyl ethers of glycerol, diglycerol, erythritol, mannitol, sorbitol, polyallyl alcohol and the like. Preferably, the epoxy constituent is a glycidyl ether of a polyhydric phenol including pyrogallol and phloroglucinol, but particularly of a dihydric phenol. The glycidyl ethers of any dihydric phenol are suitable including mononuclear phenols such as resorcinol, catechol and the like, or polynuclear phenols such as 2,2-bis(4-hydroxyphenyl) propane, bis(4-hydroxyphenyl) methane, 2-2-bis(4 hydroxyphenyl) isobutane, 2,2 - bis(2 - hydroxynaphthyl) pentane, 1 - 5 - dihydroxy-naphthalene and the like.

The term glycidyl ethers as used herein includes high molecular weight polymeric glycidyl ethers of polynuclear phenols commonly referred to as epoxy resins, such as the high molecular weight materials prepared from bis(4-hydroxyphenyl) dimethylmethane and epichlorohydrin which can be represented by the general formula

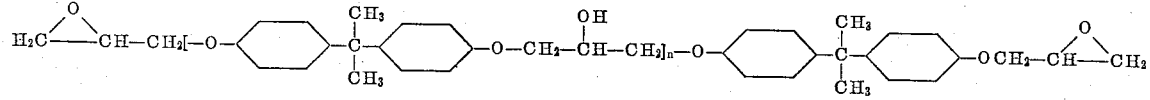

and will be referred to hereinafter as a glycidyl ether of Bisphenol A.

The amine boranes used in the new compositions are addition compounds of the amine and borane with the formula $X \cdot (BH_3)_n$ where $X$ is an amine and $n$ equals the number of amino groups in the amine molecule. The amine boranes are easily prepared by contacting the amine with diborane, either alone or in solution. The amine borane addition compound is then readily recovered by conventional methods such as sublimation, distillation or crystallization.

Amine boranes generally are useable in this invention, including polyfunctional amines in which a borane group is coordinated with each amino nitrogen. Representative examples of suitable amines include alkyl amine boranes, such as mono-, di-, and tri-methyl, ethyl, n-propyl, isopropyl, n-butyl, n-amylamine and octylamine boranes; polyfunctional aliphatic amine-boranes such as ethylenediamine-bis(borane), diethylenetriamine-tris(borane), triethylenetetramine - tetrakis(borane), dimethyl - aminopropylamine-bis(borane), and diethylaminopropylamine-bis(borane); cyclic aliphatic amines such as piperidine borane; cyclic amine boranes such as pyridine borane, lutidine borane, picoline boranes, quinoline borane and indole borane; heterocyclicamine boranes such as morpholine borane; aromatic amine boranes such as aniline borane, toluidene boranes, phenylenediamine-bis(borane), di- and triphenylamine boranes, methylene dianiline bis (borane); and mixed aliphatic-aromatic amine boranes such as dimethylbenzylamine borane, $\alpha$-methylbenzyldimethylamine borane, methylphenylenediamine-bis (borane), methylphenylamine borane, and ethylphenylamine borane.

Polycarboxylic acid anhydrides generally are suitable for use. Illustrative of those which have found wide use are phthalic anhydride, maleic anhydride, hexahydrophthalic anhydride, pyromellitic dianhydride, dodecenyl succinic anhydride, dichloromaleic anhydride, and chlorendic anhydride.

Epoxide-amine borane compositions are formed simply by mixing the constituents. The mixing techniques vary somewhat depending on the glycidyl ether and amine borane used. Fluid glycidyl ethers and fluid amine boranes are miscible and may be merely stirred together. The liquid amine boranes, such as triethylamine borane and pyridine borane drastically reduce the viscosity of the glycidyl ether, giving mixtures more easily handled and molded, e.g., 5 parts of pyridine borane was added to 100 parts of polyglycidyl ether of bisphenol A having a viscosity of 12,000 cps. and the resulting composition had a viscosity of only about 2,000 cps. An effective amount of solid amine boranes will dissolve in fluid glycidyl ethers at room or slightly elevated temperatures. The preferred method of mixing a composition containing more amine borane than is readily soluble at room temperature is to heat the glycidyl ether so that the desired amount of amine borane goes into solution, and then to permit the mixture to cool to room temperature for storage until used. Some of the amine borane may then crystallize, but more often a stable solution is obtained. Crystallized traces of amine borane redissolve when the resin is reheated for resinification and produce no noticeable adverse effects. Less fluid or solid glycidyl ethers may be heated and mixed with the amine boranes at elevated temperatures.

Epoxide-amine borane compositions are stable against resinification at ambient or moderate temperatures up to about 150° F. Thus, for example, compositions containing 1, 5, 10, 25 and 50 parts (by weight) pyridine borane, 5, and 10 parts dimethylamine borane, 2.5 parts trimethylamine borane, 2.5, 5 and 10 parts morpholine borane, 2.5, 5, and 10 parts isoctylamine borane, to 100 parts of Union Carbide Plastics Company resin ERL–2774, a polyglycidyl ether of bisphenol A having an epoxy equivalent weight of about 190, showed no indication of reaction or resinification after 1 week at room temperature (about 80° F.). Other similar compositions showed no resinification even after 6 weeks. Other polyglycidyl ethers and amine borane mixtures behave similarly. For example, compositions containing 0.5 and 1.0 part of triethylamine borane and 0.5 and 1.0 part benzyl dimethylamine borane in 100 parts Ciba epoxy resin 6010, a polyglycidyl ether of bisphenol A having an epoxy equivalent weight of about 190, showed no indication of resinification at room temperature after two weeks.

Compositions containing polycarboxylic acid anhydride are similarly formed by mixing the constituents at ambient or elevated temperatures depending on the particular acid anhydride epoxide or amine borane used. Generally the proportions of acid anhydride and epoxide are adjusted so that there are between about 0.85 to 1.1 mols of anhydride carboxyl per epoxy group, although higher or lower amounts may be used.

The amine borane may be added to either the acid anhydride or epoxide constituent before mixing, or it may be added during the mixing of the acid anhydride and epoxide, or it may be added to the mixed acid anhydride-epoxide compositions.

Useable resin forming compositions may have a wide range of amine borane concentration, but it is generally preferred to use between 0.1 and 12 parts by weight of amine borane to 100 parts by weight of polyglycidyl ether when the amine borane is used as a sole curing agent. Within this range the resins formed have better physical properties which are less dependent on the curing conditions. When using an amine borane derived from a very volatile parent amine, such as dimethylamine or trimethylamine, it is preferred to use less than about 5 parts of the amine borane to 100 parts of the glycidyl ether. With higher proportions of such amine boranes the curing temperature must be maintained below about 230° F. to prevent bubble formation and foaming, and a longer curing time is thereby required.

When the amine borane is used as an accelerator for epoxide-acid anhydride composition it is preferred to use between about 0.01 to 3 parts of amine borane to 100 parts of acid anhydride epoxide composition to obtain optimum cured resin properties, although larger or smaller amounts of amine boranes may be used if desired.

The following examples are illustrative of the practice of this invention.

Example 1

5 g. of morpholine borane was dissolved in 100 g. of epoxide resin ERL–2774, and the mixture was heated to 225° F. in a flat dish mold. The composition gelled in 300 minutes at this temperature to a clear hard resin. The Shore A hardness at 230° F. was 94 and the Barcol hardness at 66° F. was 33. Other compositions of morpholine borane and ERL–2774 were cured at 250° F. with the following results:

| Parts Morpholine Borane per Hundred Parts ERL–2774 | Gel Time (Minutes) | Shore A Hardness |
|---|---|---|
| 2.5 | 270 | 85 |
| 5 | 135 | 87 |
| 10 | 35 | 70 |

The amine borane curing agents are substantially different from prior known heat-actuated amine curing agents, such as amine salts of fatty acids. In these prior curing agents, the amine is chemically combined at low temperatures thereby preventing a cure; when the mixtures are heated the amine is released by thermal decomposition of the salt, making the free amine available to act as a curing agent. The amine boranes, however, provide more rapid cures than the corresponding amines alone, and cures are obtained with amine boranes made from a parent amine constituent that is itself not a curing agent. For example, morpholine ERL–2774 mixtures did not resinify at 250° F. even after 72 hours. Similarly, a composition of 2.1 parts of pyridine ot 100 parts of ERL–2774 gelled at 225° F. only after 5.5 hours, while a composition of 2.5 parts pyridine borane to 100 parts ERL–2774 gelled at 225° F. in only 3.5 hours.

Example 2

0.1 g. of benzyldimethylamine borane was mixed in 20 g. of ERL–2774. The composition was heated to 250° F. and gelled in 5.17 hours at this temperature. The resin formed thereby had a Shore D hardness at 250° F. of 30, and a Barcol hardness at room temperature of 29. Another composition containing 1.0 part of benzyldimethylamine borane to 100 parts of ERL-2774, cured in 2.37 hours at 250° F., and the resulting resin had a Shore D hardness at 250° F. of 54, and a Barcol hardness at room temperature of 28. The improved curing time and physical properties obtained by use of the amine boranes are evident from comparison with the curing of a composition of 100 parts ERL-2774 and 1.0 part benzyldimethylamine. This composition gelled in 4.5 hours at 250° F. and had a Shore D hardness at 250° F. of only 15, and a Barcol hardness at room temperature of only 18.

*Example 3*

Other compositions of ERL-2774 and various amine boranes were made and cured to form hard resins in the same manner as in the previous examples. The results are set forth in the following table.

| Amine Borane | Phr.[1] amine borane | Cure Temp., °F. | Gelling Time | Shore D Hardness | Barcol Hardness |
|---|---|---|---|---|---|
| $(C_2H_5)_3NBH_3$ | 0.5 | 250 | 11.3 hr | 10/250° F | 12/room temp. |
|  | 1.0 | 250 | 5 hr | 46/250° F | 24/room temp. |
| $(CH_3)_2HNBH_3$ | 5 | 250 | 45 min |  | } 40/room temp.[2] |
|  | 5 | 230 | 30 min |  |  |
| $(CH_3)_3NBH_3$ | 2.5 | 250 | 90 min |  |  |
|  | 2.5 | 230 | 120 min |  | } 32/40/room temp. |
|  | 2.5 | 200 | 48 hrs |  |  |

[1] Phr.=parts of amine borane per 100 parts of polyglycidyl ether.
[2] Partially foamed; hardness measured on unfoamed parts.

*Example 4*

The following examples illustrate the effectiveness of amine boranes as latent accelerators for acid anhydride epoxide compositions. A composition of 74 parts hexahydrophthalic anhydride and 100 parts of Bakelite Company resin ERL-2774, a diglycidyl ether of bisphenol A having an epoxy equivalent weight of about 190, cures very slowly: at 200° F. the composition gels only after about one week. Compositions containing 74 parts hexahydrophthalic anhydride, 100 parts ERL-2774, and minor proportions of amine borane, however, cure much more rapidly, as is shown in the following table:

| Anhydride-Epoxide | Amine Borane | Parts Amine Borane | Gel Time at 200° F. (minutes) |
|---|---|---|---|
| 100 parts ERL-2774, 74 parts hexahydrophthalic anhydride. | Dimethylamine borane | 0.5 | 140 |
|  | Trimethylamine borane | 0.5 | 85 |
|  | Pyridine borane | 0.5 | 20 |

The gel time of the same anhydride-epoxide composition using 0.5 part of benzyl dimethylamine, a typical amine accelerator, is about 30 minutes at 200° F.

The amine borane containing compositions are stable against resinification at normal room temperature, about 70° F., for an extended period of time, up to several months. They are also resistant to resinification at higher ambient temperatures which may be encountered transiently in storage or transport. For example, compositions the same as those set forth in the above examples had the following gel times at 125° F.: dimethylamine borane accelerator, 264 hours; trimethylamine borane accelerator, 95 hours; and pyridine borane accelerator, 72 hours. In contrast, the composition with benzyldimethylamine accelerator gelled in only 8 hours at 125° F.

These new resin forming compositions are particularly useful for casting, potting, encapsulation, and surface coating in the usual manner. The cured resins have desirable hardness, even at elevated temperatures, without being too brittle for wide application. They are not corrosive and are therefore particularly useful for protecting electrical systems and components.

According to the provisions of the patent statutes, I have explained the principle and mode of practicing my invention, and have described what I now consider to be its best embodiments. However, I desire to have it understood that, within the scope of the appended claims, the invention may be practiced otherwise than as specifically described.

I claim:
1. A heat curable resin composition comprising
  (1) 100 parts by weight of
    (a) a polyglycidyl ether having a 1,2 epoxy equivalency greater than 1.0 and
    (b) a polycarboxylic acid anhydride in the proportions of between about 0.85 and 1.1 moles of anhydride carboxyl per epoxy group, and
  (2) between about 0.01 to 3 parts by weight of an amine borane selected from the group consisting of lower alkylamine boranes, cyclic amine boranes, and arylalkylamine boranes.
2. A composition according to claim 1 in which the amine borane is pyridine borane.
3. A composition according to claim 1 in which the amine borane is dimethylamine borane.
4. A composition according to claim 1 which the amine borane is trimethylamine borane.

References Cited

UNITED STATES PATENTS 2,723,241  11/1955  De Groote et al. _____ 260—47
2,970,130   1/1961  Finestone _____ 260—47

OTHER REFERENCES

Chem. and Eng. News, vol. 37 (No. 18), pages 56–58, May 4, 1959.

Callery Chemical Co. Tech. Bulletin C-200 (Aug. 1, 1957), 7 pages.

Zaehringer: "Solid Propellant Rockets, Second Stage," pages 209–212 relied on, American Rocket Co., Box 1112, Wyandotte, Mich., 1958.

WILLIAM H. SHORT, *Primary Examiner.*

SAMUEL H. BLECH, *Examiner.*

T. D. KERWIN, *Assistant Examiner.*